UNITED STATES PATENT OFFICE.

ANTONIO PELLETIER, OF WASHINGTON, DISTRICT OF COLUMBIA.

IMPROVEMENT IN BARRELS AND CASKS FOR CONTAINING OILS, &c.

Specification forming part of Letters Patent No. 73,643, dated January 21, 1868.

*To all whom it may concern:*

Be it known that I, ANTONIO PELLETIER, of the city of Washington, in the District of Columbia, have invented certain new and useful Improvements in the Composition of Matter for Coating Oil-Vessels, &c.; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use my invention, I will proceed to describe it.

My invention relates to the composition of matter; and consists of a new and useful compound for coating the interior of all vessels used to hold petroleum, as well as similar and all other kinds of oils, turpentine, and other liquids with like penetrating qualities. The object of my invention is to furnish a compound for coating all vessels used for holding or transporting oils, turpentine, &c., of such a nature as will render them perfectly proof against leakage, and consequently less liable to accident and destruction by fire.

It is well known that refiners of petroleum, as well as of similar and other oils, lose nearly ten per cent. by leakage, besides being compelled to pay double charges for insurance and transportation. In order to prevent this leakage, and render the vessels containing the oils, turpentine, &c., comparatively fire-proof, I have experimented with various compounds for coating their interior or exterior, or both surfaces, and find that the following compound, applied as described, will accomplish the purpose.

In making my composition, I take red lead and the silicate of soda in the following proportions: Four ounces (4 oz.) of red lead to one gallon (1 gal.) of silicate of soda, and thoroughly incorporate and mix them together. The liquid thus made has about the consistency of thin paint. I apply it to the inside of the vessels to be used in such a way as to fill all the pores of the wood thoroughly. If desired, it may also be applied to the outside. When thus applied the vessel will be proof against leakage, and, for a considerable time, proof against fire.

This composition may be applied to wrapping-paper, paper boxes, match-boxes, and similar articles. When applied to any of these articles care must be taken to cover them completely, so as to prevent any portion of them being exposed to the oil on account of its great capillary attraction.

I have discovered, in my experiments, that, in the place of red lead, talc, talcose slate, steatite, and similar substances may be used advantageously, and, whenever the same can be more cheaply or conveniently obtained, they can be used in making my composition.

This composition, when consisting of red lead and silicate of soda, as described, is intended specially for coating the interior of vessels. When used on the exterior, I treat it with coal-tar and steatite, as claimed in my patent No. 71,210, dated November 19, 1867, or with chloride of calcium, particularly when there is any probability of exposure to damp or wet of any kind.

By the addition of red lead the silicate is prevented from cracking, as it otherwise would when exposed to the action of the atmosphere, after being applied to the surface of the wood, and thus I produce a composition admirably adapted to the purpose for which it is intended.

Having thus described my invention, what I claim is—

1. The composition consisting of silicate of soda and red lead united, as a coating for oil-barrels and similar vessels, as described.

2. As a new article of manufacture, an oil-barrel or similar vessel when coated with the composition herein described.

ANTONIO PELLETIER.

Witnesses:
 H. B. MUNN,
 P. T. DODGE.